(No Model.)

P. N. TRYON.
VEIL FASTENER.

No. 408,445. Patented Aug. 6, 1889.

Witnesses,
Geo. H. Strong

Inventor,
Philo N. Tryon
By Dewey & Co.
atty

UNITED STATES PATENT OFFICE.

PHILO. N. TRYON, OF SAN FRANCISCO, CALIFORNIA.

VEIL-FASTENER.

SPECIFICATION forming part of Letters Patent No. 408,445, dated August 6, 1889.

Application filed April 25, 1889. Serial No. 308,606. (No model.)

*To all whom it may concern:*

Be it known that I, PHILO. N. TRYON, of the city and county of San Francisco, State of California, have invented an Improvement in Veil-Fasteners; and I hereby declare the following to be a full, clear, and exact description of the same.

Figure 1:
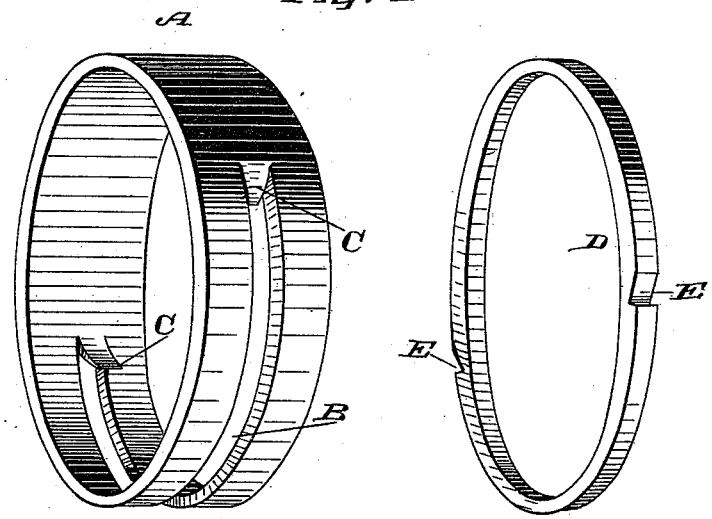
Figure 2:
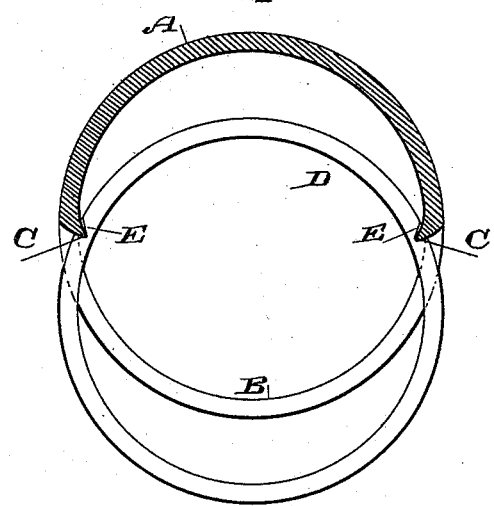

Referring to the accompanying drawings for a more complete explanation of my invention, Figure 1 is an enlarged perspective view showing the two rings separated. Fig. 2 is an enlarged sectional view taken in the plane of the slot of the outer ring, showing the two locked together.

A is the outer ring, having the slot B made around its periphery about midway between the two ends, said slot extending something more than half the circumference of the ring and having the inwardly-turned angles or catches, as shown at C. D is the inner ring, having the diameter about the same as that of the outer ring and made narrow enough so that it can be slipped into the slot B. This ring has notches E corresponding with the latches C of the outer ring, so that when the inner ring is forced into the outer one these latches will engage with the notches E, and will thus hold the two rings locked together, as shown at Fig. 2. These rings are made of any suitable diameter so that one end of the scarf or veil to be fastened can be drawn into each of the rings, being held by the fingers. The veil is brought across the face, the ends being brought together behind the head, and the two rings are slipped together and latched, as shown in Fig. 2, and they compress the ends of the veil or scarf, and thus hold it firmly and prevent its slipping out. The rings are easily detached from each other by slightly pressing them, so as to release the catches.

Having thus described my invention, what I claim as new, and desire to secure by Letters Patent, is—

The ring A, having a portion of its circumference slotted, and having inwardly-turned catches at the ends of the slot, in combination with the ring B, adapted to be passed into the slot, and having notches with which the catches engage, substantially as described.

In witness whereof I have hereunto set my hand.

PHILO. N. TRYON.

Witnesses:
S. H. NOURSE,
GEO. H. STRONG.